United States Patent Office 3,347,858
Patented Oct. 17, 1967

3,347,858
TERTIARY AMINOETHYL [-BETA-(1-NAPHTHYL)-BETA'-TETRAHYDROFURYL ISOBUTANE] AND ALPHA LOWER ALKENYL ETHERS
Etienne Szarvasi and Michel Bayssat, Lyon, France, assignors to Lipha, Lyonnaise Industrielle Pharmaceutique
No Drawing. Filed Nov. 8, 1966, Ser. No. 592,730
Claims priority, application France, Mar. 28, 1963, 929,519
11 Claims. (Cl. 260—247.7)

ABSTRACT OF THE DISCLOSURE

Novel aminoether oxides substituted by at least one naphthyl or naphthyl methyl radical having the formula

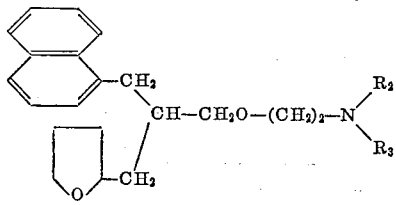

or

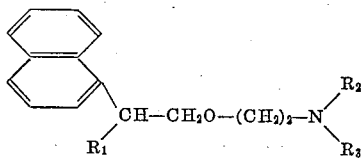

wherein $R_1$ is an olefinic radical containing 3 or 4 carbon atoms, and $R_2$ and $R_3$ are selected from the group consisting of methyl, ethyl and together with the nitrogen atom, piperidino, pyrrolidino and morpholino.

---

This application is a continuation-in-part of application Ser. No. 352,963, filed Mar. 18, 1964.

This invention relates to new nitrogenous bases substituted by at least one naphthyl or naphthyl-methyl radical, and particularly to new amino ether oxides which are thus substituted and to a certain number of their derivative compounds in the preparation thereof.

Certain new amino ether oxides, endowed with very interesting antispasmodic properties, have been discovered according to the invention. These compounds are those represented by the general formula:

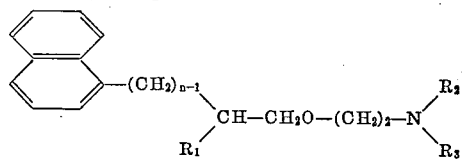

and their acid salts and quaternary ammonium derivatives, wherein $n$ represents a positive integer at most equal to 2;

$R_1$ is a member of the group consisting of the tetrahydrofuryl radical when $n=2$, and a non-saturated aliphatic radical containing 3 to 4 carbon atoms when $n=1$;

$R_2$ is a member of the group consisting of the lower alkyl radicals and the atoms necessary for completing in combination with $R_3$ and the adjacent nitrogen atom, a heterocyclic compound of the group consisting of the piperidine, pyrrolidine and morpholine; and $R_3$ is a member of the group consisting of the lower alkyl radicals and the atoms necessary for completing in combination with $R_2$ and the adjacent nitrogen atom, a heterocyclic compound of the group consisting of the piperidine, pyrrolidine and morpholine.

These new compounds can be obtained according to the invention by condensing a halogenoethylamino derivative of the formula

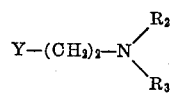

wherein Y is a halogen, and $R_2$ and $R_3$ are as defined above, with the sodium derivative of the alcohol corresponding to the desired ether oxide, the latter preferably being obtained by the action of sodium amide on alcohol, said alcohol having the general formula:

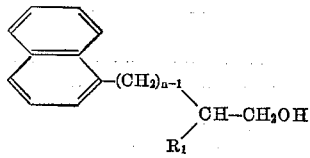

wherein $n$ and $R_1$ have the same meanings as above.

The above disubstituted alcohols capable of being used as intermediate products in the obtaining of the new ether oxides, are new compounds, and in this capacity they are described and claimed in our copending application Ser. No. 592,755, filed on the same day as the present application. Briefly these alcohols are obtained by reducing (preferably with lithium-aluminum hydride) in an inert solvent, an ester (preferably a methyl ester) corresponding to the desired alcohol.

The mineral and organic acid salts of the new ether oxides according to the invention, such as the salts of phosphoric, oxalic and fumaric acids, are obtained by neutralisation, and the quaternary ammonium derivatives are obtained by reaction of an alkyl halide, particularly methyl iodide, with the corresponding amino ether oxides, which thus constitute intermediate derivatives in the preparation of their derivatives.

Used in the Magnus test on the isolated intestine of a guinea pig, the new compounds according to the invention have an antispasmodic activity which is 10 to 40 times better than that of papaverine.

In the form of an addition salt, these compounds have a peripheral and coronary vasodilatory action which is comparable in very advantageous manner to that of the best products so far employed in this indication.

On the other hand, it is to be observed that the local anesthetic activity of these derivatives is likewise very high, and this may reach 5 to 10 times that of diethylaminodimethyl-2,6-acetanalide hydrochloride.

The processes for the preparation of the physical constants of various compounds which form the subject of the present invention are hereinafter described as non-limitative examples.

EXAMPLE 1

*N-dimethylaminoethoxy-β-(1-naphthyl)-β'-tetrahydrofuryl isobutane*

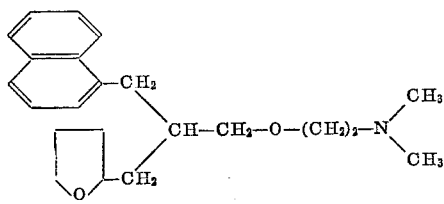

14 g. (0.37 mol) of LiAlH$_4$ and 1600 cc. of dry ether are placed in a spherical flask equipped with a mechanical stirrer device, a reflux condenser and a dropping funnel. 120 g. (0.41 mol) of methyl-β-(1-naphthyl)-β'-tetrahydrofuryl isobutyrate in solution in 120 cc. of ether are introduced dropwise into the flask by means of dropping funnel.

The speed of addition is regulated in such a way that the ether is caused to boil gently. The duration of the addition is 1 hour 25 minutes. The yellow mixture is heated under reflux for 4 hours. The complex which forms is decomposed by carefully adding dropwise 320 cc. of water and then 600 cc. of 10% H$_2$SO$_4$.

After extraction with ether and drying the extract over Na$_2$SO$_4$, distillation yields 89 g. of viscous yellow liquid with B.P.$_{0.95 \text{ millibar}}$=184–185° C. The yield is 82% (theoretical quantity=108.5 g.).

The redistilled product is analytically pure β-(naphthyl)-β'-tetrahydrofuryl-1-isobutanol and has the following constants:

B.P.$_{0.816 \text{ millibar}}$ _____ °C__ 179
Refractive index $n_d^{24.5}$ _____ 1.595
Acidity index:
  Calculated _____ 207
  Found _____ 211

Gravimetric analysis, percent.—Calculated: C, 79.96; H, 8.20. Found: C, 79.95; H, 7.95.

250 cc. of anhydrous benzene and 4 g. (0.10 mol=3.9 g.) of the β-(naphthyl)-β'-tetrahydrofuryl-1-isobutanol are placed in a dry apparatus, heated under reflux for 1 hour, and after cooling, 11 g. (0.10 mol=10.7 g.) of N-[β-chloroethyl]-dimethylamine are added.

After heating under reflux for 16 hours, the reaction mixture is treated with water and the organic layer extracted with benzene. The distillation of the extract yields 25 g. of a fairly clear liquid with a B.P.$_{0.49 \text{ millibar}}$=166–168° C. The yield is 73.5% (theoretical quantity=34.1 g.).

EXAMPLE 2

*N-dimethylaminoethoxy-β-(1-naphthyl)-β'-tetrahydrofuryl isobutane methiodide*

C$_{23}$H$_{34}$INO$_2$    M=483.43

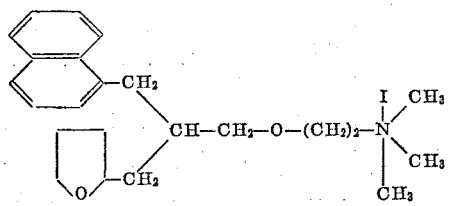

7 g. (0.0203 mol) of N-dimethylaminoethoxy-β-(1-naphthyl)-β'-tetrahydrofuryl isobutane are dissolved in 7 cc. of alcohol and 3 g. (0.021 mol) of methyl iodide are added dropwise thereto. A slight heating of the liquid is found and the addition of ether causes the precipitation of an oil which solidifies after 3 hours at ambient temperature. The centrifuging of the crystalline product, effected after having been in the refrigerator for 48 hours, yields 8 g. of crystals. The yield is 80% (theoretical quantity=9.95 g.). After having been recrystallized four times from a large excess of alcohol, the melting point is 153–155° C. (tube).

Gravimetric analysis, percent.—Calculated: C, 57.15; H, 7.09; N, 2.90. Found: C, 56.78; H, 6.80; N, 2.99.

EXAMPLE 3

*Acid oxalate of N-dimethylaminoethoxy-β-(1-naphthyl)-β'-tetrahydrofuryl isobutane*

C$_{24}$H$_{33}$NO$_6$    M=431.51

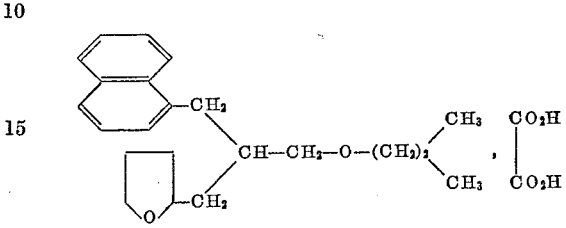

10.5 g. (0.034 mol) of N-dimethylaminoethoxy-β-(1-naphthyl)-β'-tetrahydrofuryl isobutane are treated with the stoichiometric quantity of oxalic acid. The reaction mixture is heated under reflux for 15 minutes. After cooling 35 cc. of hexane are added thereto. The crystallisation of the mixture yields 8 g. of white crystals with a melting point of 76–78° C. (capillary tube). The yield is 60.6% (theoretical quantity=13.2 g.).

After recrystallisation from a mixture of ethyl acetate and alcohol, an analytically pure product is obtained which has the following constants:

M.P. (capillary tube) _____ °C__ 77–79
Acidity index:
  Calculated _____ 259
  Found _____ 247

Gravimetric analysis, percent.—Calculated: C, 66.80; H, 7.71; N, 3.24. Found: C, 66.93; H, 7.36; N, 3.43.

EXAMPLE 4

*N-diethylaminoethoxy-[β-(1-naphthyl)-β'-tetrahydrofuryl]-isobutane*

C$_{24}$H$_{35}$NO$_2$    M=369.52

230 cc. of dry benzene and 4 g. (0.10 mol=3.9 g.) of 95% sodium amide are placed in a dry spherical flask equipped with a mechanical stirrer and dropping funnel. 27 g. (0.10 mol) of β-(1-naphthyl)-β'-tetrahydrofuryl-1-isobutanol are introduced thereinto. Heating under reflux takes place for 1 hour, the mixture becoming brown. After cooling, 13.5 g. (0.10 mol) of β-chloroethyl-N-diethylamine are added dropwise.

Heating under reflux takes place for 16 hours. The excess sodium amide is destroyed by adding an equal volume of water and the organic layer is extracted with benzene. After drying over sodium sulphate, the distillation of the extract yields 28.5 g. of a yellow oily product which has an amino odour and a B.P.$_{0.57 \text{ millibar}}$=169–171° C. The yield is 77% (theoretical quantity=36.9 g.). The redistilled product has the following constants:

B.P.$_{0.408 \text{ millibar}}$=160° C.
Refractive index $n_d^{25}$=1.5583
Density $d_4^{20}$=1.014

It is analysed in the methiodide form.

EXAMPLE 5

*N-diethylaminoethoxy-[β-(1-naphthyl)-β'-tetrahydrofuryl]-isobutane methiodide*

$C_{25}H_{38}NO_2I$    M=511.48

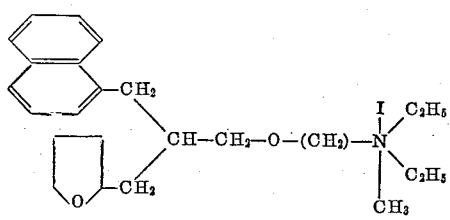

7.4 g. (0.02 mol) of N-diethylaminoethoxy-[β-(1-naphthyl)-β'-tetrahydrofuryl]-isobutane are dissolved in 8 cc. of alcohol and 3 g. (0.021 mol) of methyl iodide are added dropwise thereto. After the exothermic reaction has ceased, 100 cc. of dry ether are added to the mixture.

An oil is precipitated which is quickly changed, after scratching with a glass rod, into a white crystalline mass. The solid is centrifuged after standing overnight in a refrigerator, it is washed with ether and dried over $P_2O_5$ in vacuo. 9 g. of white crystals are obtained with a melting point of 66–70° C. (capillary tube). The yield is 88% (theoretical quantity=10.2 g.).

After being recrystallised twice (alcohol-ether and then alcohol by itself), the product is analytically pure, melting at 89–91° C. (capillary tube).

The product is slightly hygroscopic. After having been left standing in air for some time, it melts sharply at 72–74° C.

*Gravimetric analysis, percent.*—Calculated: C, 58.71; H, 7.49; I, 24.82. Found: C, 58.63; H, 7.36; I, 24.93.

EXAMPLE 6

*N-piperidinoethoxy-[β-(1-naphthyl)-β'-tetrahydrofuryl]isobutane*

$C_{25}H_{35}NO_2$    M=381.53

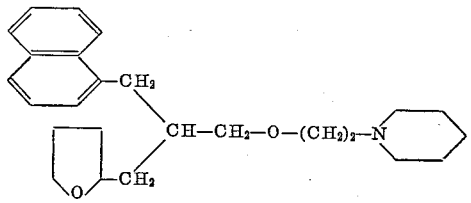

27 g. (0.10 mol) of β-(1-naphthyl)-β'-tetrahydrofuryl-1-isobutanol are treated under the conditions of Example 4 with 15 g. (0.10 mol=14.8 g.) of N-(β-chloroethyl)-piperidine.

Distillation supplied 28 g. of a viscous liquid having a B.P.$_{0.68-0.816\ \text{millibar}}$=190–192° C. The yield is 73.5% (theoretical quantity=38.1 g.).

The redistilled product has the following constants:

B.P.$_{0.545\ \text{millibar}}$=191–193° C.
Refractive index $n_d^{20.5}$=1.564

It is analysed in the form of its phosphate.

EXAMPLE 7

*N-piperidinoethoxy-[β-(1-naphthyl)-β'-tetrahydrofuryl]-isobutane phosphate*

$C_{25}H_{38}NO_6P$    M=479.54

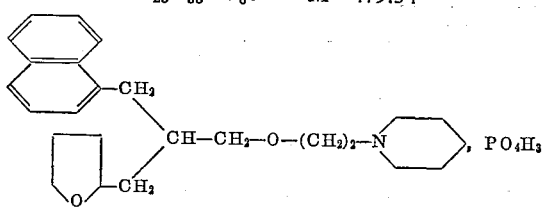

3.8 g. (0.01 mol) of N-piperidinoethoxy-[β-(1-naphthyl)-β'-tetrahydrofuryl]-isobutane are dissolved in 10 cc. of isopropanol and 1.2 g. (0.019 mol=1.17 g.) of 85% orthophosphoric acid are added dropwise to the solution. The isopropanol is evaporated in vacuo and the viscous residue is taken up in 14 cc. of hot alcohol. The recrystallisation takes place after standing overnight. After washing the solid with ether and drying in vacuo, there are obtained 4 g. of crystals having a melting point of 126° C. (capillary tube). The yield is 83% (theoretical quantity=4.8 g.).

After recrystallisation from alcohol, the product is analytically pure. Melting point=130–132° C. (capillary tube).

*Gravimetric analysis, percent.*—Calculated: C, 62.62; H, 7.99; N, 2.92. Found: C, 62.58; H, 7.79; N, 3.00.

EXAMPLE 8

*N-(β-morpholinoethoxy)-β-tetrahydrofuryl-β'-(1-naphthyl)-isobutane*

$C_{24}H_{33}NO_3$    M=383.51

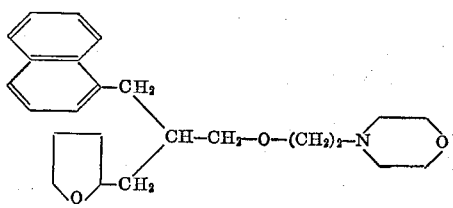

27 g. (0.01 mol) of β-(1-naphthyl)-β'-tetrahydrofuryl-1-isobutanol are treated with 23 g. (0.155 mol) of N-(β-chloroethyl)-morpholine, in the presence of dry toluene as solvent, under the conditions of Example 7. By distillation, there are obtained 25 g. of a yellow oil having a faint odor and a B.P.$_{1.09\ \text{millibar}}$=205–207° C., and a refractive index $n_d^{24}$=1.567. The yield is 65.5% (theoretical quantity=38.3 g.).

EXAMPLE 9

*Acid oxalate of N-(β-morpholinoethoxy)-β-tetrahydrofuryl-β'-(1-naphthyl)-isobutane*

$C_{26}H_{35}NO_7$    M=473.55

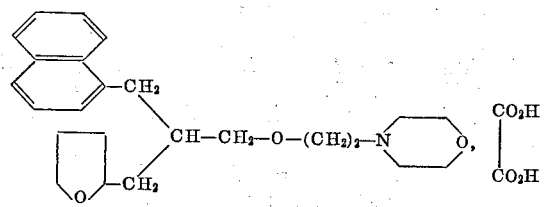

3.8 g. (0.010 mol) of N-(β-morpholinoethoxy)-β-tetrahydrofuryl-β'-(1-naphthyl)-isobutane are treated with 1.3 g. (0.0103 mol) of dihydrated oxalic acid under the conditions of Example 3 and there are obtained 3.9 g. of white craystals with a melting point of 84–86° C. (capillary tube). The yield is 83% (theoretical quantity 4.7 g.).

Recrystallisation in ethyl acetate does not alter the melting point.

The acidity index of the product is as follows:

Acidity index:
  Calculated _____ 236
  Found _____ 231

*Gravimetric analysis, percent.*—Calculated: C, 65.94; H, 7.45; N, 2.96. Found: C, 66.03; H, 7.29; N, 2.89.

EXAMPLE 10

*N-diethylaminoethoxy-α(1-naphthyl) Δ-hex-4-ene*

$C_{22}H_{31}NO$    M=325.47

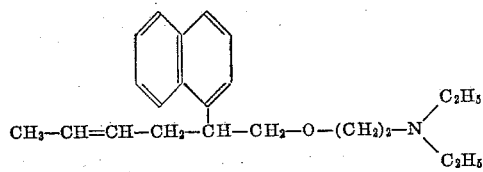

3.5 g. (0.095 mol) of lithium-aluminium hydride and 400 cc. of anhydrous ether are placed in a fluid-tight and dry apparatus and 25.5 g. (0.10 mol) of methyl-α-(1-naphthyl)-hexenoate in 50 cc. of anhydrous ether are introduced dropwise thereinto by means of a dropping funnel. The speed of addition is regulated in such manner that the ether is caused to boil gently. The duration of the addition is 40 minutes. The mixture is heated under reflux for 2 hours. The decomposition of the complex is effected by adding 80 cc. of water and then 150 cc. of 10% $H_2SO_4$.

The ethereal layer is dried and then distilled and the desired product of α-(1-naphthyl)-Δ-hex-4-en-1-ol is obtained in the form of a light yellow liquid, with a quantitative yield.

The product has the following constants:

$B.P._{1.36\ millibar}$ _____ °C__ 136
Refractive index $n_d^{21}$ _____ 1.604
Density=$d_4^{21.5}$ _____ 1.0493

Acidity index:
Calculated _____ 247
Found _____ 237

*Gravimetric analysis, percent.*—Calculated: C, 84.92; H, 8.01. Found: C, 84.86; H, 7.86.

690 cc. of dry benzene and 12 g. (0.3 mol=11.7 g.) of 97% sodium amide are placed in a dry apparatus and 69 g. (0.3 mol) of the α-(1-naphthyl)-Δ-hex-4-en-1-ol are introduced thereinto dropwise. The mixture is heated under reflux for 1 hour. As soon as the heating commences, liberation of ammonia is observed.

After cooling to normal temperature, 40.5 g. (0.3 mol) of β-chloroethyl-N-diethylamine are introduced dropwise. The mixture is heated under reflux for 16 hours. After heating for 5 minutes, a precipitate appears. When the reaction is terminated, water is added to the reaction mixture and then the organic layer, previously dried, is distilled. 71 g. of a clear yellow liquid are obtained, this liquid distilling at 158–160° C. under a pressure of 0.75 millibar. The yield is 73% (theoretical quantity=97.5 g.).

The redistilled product is analytically pure and has the following constants:

$B.P._{0.367\ millibar}$=145.5–146.5° C.
Refractive index $n_d^{23}$=1.552
$d_4^{23}$=0.957

*Gravimetric analysis, percent.*—Calculated: C, 81.21; H, 9.60; N, 4.30. Found: C, 81.25; H, 9.51; N, 4.33.

EXAMPLE 11

*N-diethylaminoethoxy-α(1-naphthyl)-Δ-hex-4-ene methiodide*

$C_{23}H_{34}INO$    M=467.42

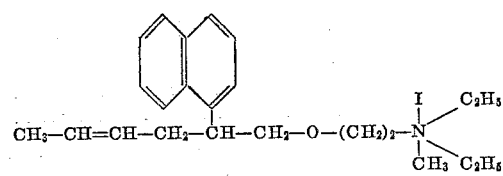

16.2 g. (0.05 mol) of N-diethylaminoethoxy-α-(1-naphthyl)-Δ-hex-4-ene are treated with 7 g. (0.05 mol) of methyl iodide under the conditions set out in Example 8. The product crystallises slowly in a refrigerator and there are obtained 16 g. of slightly pasty white crystals. The yield is 69% (theoretical quantity=23.2 g.).

After having been recrystallised twice (alcohol-ether), the product is analytically pure and it has a melting point of 80–82° C. (capillary tube). It is slightly hygroscopic.

*Gravimetric analysis, percent.*—Calculated: C, 59.10; H, 7.33; N, 2.99. Found: C, 59.67; H, 7.34; N, 2.88.

EXAMPLE 12

*N-dimethylaminoethoxy-α-(1-naphthyl)-Δ-hex-4-ene*

$C_{20}H_{27}NO$    M=297.42

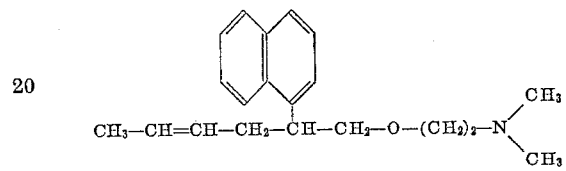

23 g. (0.10 mol) of α-(1-naphthyl)-Δ-hex-en-1-ol are treated with 11 g. (0.10 mol) of β-chloroethyl-dimethylamine according to Example 9. Distillation yields 22 g. of viscous yellow liquid having a $B.P._{0.816\ millibar}$=147–148° C. The yield is 74% (theoretical quantity=29.7 g.).

The redistilled product is analytically pure, is practically colorless and it has the following constants:

$B.P._{0.65\ millibar}$=143–143.5° C.
$n_d^{23}$=1.573
$d_4^{22}$=0.989

It is identified by the analysis of its methiodide.

EXAMPLE 13

*N-dimethylaminoethoxy-α-(1-naphthyl)-Δ-hex-4-ene methiodide*

$C_{21}H_{30}INO$    M=439.37

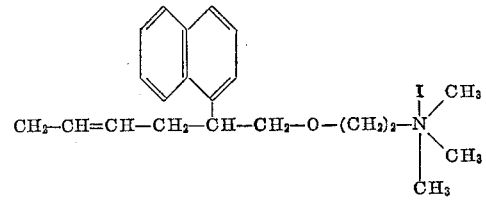

8 g. (0.027 mol) of N-dimethylaminoethoxy-α-(1-naphthyl)-Δ-hex-4-ene are treated with 4 g. (0.028 mol) of methyl iodide under the conditions according to Example 8. 6.5 g. of slightly yellow crystals with a melting point of 69–71° C. (capillary tube) are obtained. The yield is in the region of 54% (theoretical quantity=12 g.).

After being recrystallised twice, from alcohol and ether, the product is analytically pure.

M.P.=80–82° C. (capillary tube).

*Gravimetric analysis, percent.*—Calculated: C, 57.41; H, 6.88; N, 3.18. Found: C, 57.26; H, 6.88; N, 3.26.

EXAMPLE 14

*N-(β-piperidinoethoxy)-α-(1-naphthyl)-Δ-hex-4-ene*

$C_{23}H_{31}NO$    M=337.48

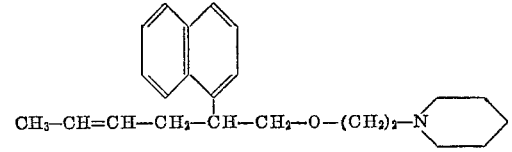

4 g. (0.10 mol=3.9 g.) of 95% sodium amide, 230 cc. of dry benzene and 23 g. (0.10 mol) of α-(1-naphthyl)-Δ-hex-en-1-ol are heated under reflux for 1 hour. After cooling, 15 g. (0.10 mol=14.7 g.) of N-(β-chloroethyl)-piperidine are added dropwise thereto.

The reaction mixture, treated in the usual manner, yields 21 g. of a yellow oil of amino odor and with a B.P.$_{0.544\ millibar}$=186–170° C.

The redistilled product is analytically pure and has the following constants:

B.P.$_{0.544\ millibar}$=158–160° C.
$n_d^{20}$=1.5688

*Gravimetric analysis, percent.*—Calculated: C, 81.87; H, 9.26; N, 4.15. Found: C, 81.16; H, 8.97; N, 4.15.

EXAMPLE 15

*N-(β-piperidinoethoxy)-α-(1-naphthyl)-Δ-hex-4-ene phosphate*

$C_{23}H_{34}NO_5P$    M=43547

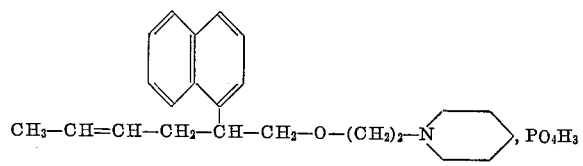

7 g. (0.062 mol=6.1 g.) of 85% orthophosphoric acid are added to a solution of 21 g. (0.062 mol) of N-(β-piperidinoethoxy)-α-(1-naphthyl)-Δ-hex-4-ene in 53 cc. of isopropane.

After standing overnight in a refrigerator, the white semi-solid mass is recovered from a layer of ether. The forming solid is centrifuged after several days in a refrigerator. When use is made of crystal of the product for starting the crystallisation, the latter takes place fairly quickly. There are obtained 23.5 g. of white crystals with a melting point of 108–110° C. (heating stage). The yield is about 84% (theoretical quantity=28 g.).

After being recrystallised twice from alcohol, followed by precipitation with ether, white crystals are obtained which have the following constants:

M.P.=112–114° C. (heating stage)

Acidity index:
Calculated=257 (for 2 acid functions)
Found=255

*Gravimetric analysis, percent.*—Calculated: C, 63.45; H, 7.87; N, 3.21. Found: C, 62.77; H, 7.33; N, 3.29.

EXAMPLE 16

*N-(β-pyrrolidinoethoxy)-α-(1-naphthyl)-Δ-hex-4-ene*

$C_{22}H_{29}NO$    M=323.45

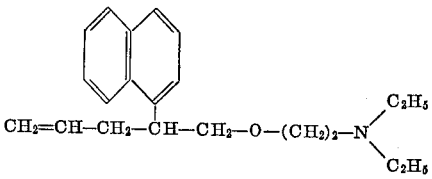

230 cc. of dry benzene, 4 g. (0.10 mol=3.9 g.) of 95% sodium amide and 23 g. (0.10 mol) of α-(1-naphthyl)-Δ-hex-4-ene-ol are heated under reflux for 1 hour. After cooling, 13.5 g. (0.10 mol= 13.36 g.) of N-(β-chloroethyl)-pyrrolidine are added thereto. Heating under reflux takes place for 16 hours and the usual treatment yields 18 g. of a viscous yellow liquid having an amino odor and the following constants:

B.P.$_{0.475\ millibar}$=162–164° C.
$n_d^{23}$=1.5695

The yield is about 56% (theoretical quantity=32.3 g.).

EXAMPLE 17

*Acid oxalate of N-(β-pyrrolidinoethoxy)-α-(1-naphthyl)-Δ-hex-4-ene*

$C_{24}H_{31}NO_5$    M=413.49

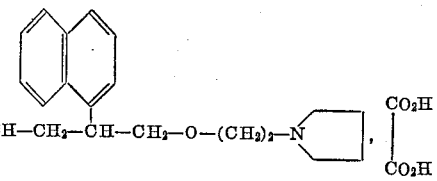

4.75 g. (0.0147 mol) of N-(β-pyrrolidinoethoxy)-α-(1-naphthyl)-Δ-hex-4-ene and 2 cc. of acetone are added to a solution of 1.85 g. (0.0147 mol) of dihydrated oxalic acid in 12 cc. of acetone.

The reaction mixture, covered with a layer of hexane, crystallises quickly in a refrigerator. 5.5 g. of white crystals are obtained with a melting point of 100–103° C. (heating stage). The yield is 84% (theoretical quantity=6.6 g.).

After recrystallisation from alcohol, the melting point remains unchanged and the product has the following acidity index:

Acidity index:
Calculated _____ 270
Found _____ 274

*Gravimetric analysis, percent.*—Calculated: C, 69.72; H, 7.56; N, 3.38. Found: C. 69.61; H, 7.57; N, 3.57.

EXAMPLE 18

*N-(β-pyrrolidinoethoxy)-α-(1-naphthyl)-Δ-hex-4-ene methiodide*

$C_{23}H_{32}INO$    M=465.41

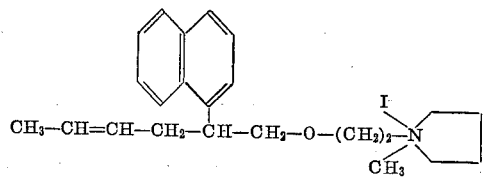

8 g. (0.0246 mol) of N-(β-pyrrolidinoethoxy-α-(1-naphthyl)-Δ-hex-4-ene in 8 cc. of alcohol are heated under reflux with 7.4 g. (0.05 mol) of methyl iodide for 15 minutes. The liquid is cooled to ambient temperature, covered with ether and left to stand overnight in a refrigerator. 9 g. of crystals with a melting point of 60–65° C. (heating stage) are obtained and the yield is 78% (theoretical quantity=11.5 g.).

After being recrystallised three times from alcohol, the white product is analytically pure and it melts at 81–83° C. (heating stage).

*Gravimetric analysis, percent.*—Calculated: C, 59.34; H, 6.93; N, 3.00; I, 27.27. Found: C, 59.22; H, 6.74; N, 2.96; I, 27.35.

It will be observed that the quantity of methyl iodide used is in an excess of 100% relatively to the stoichiometric quantity; otherwise, there is only obtained an oily product which does not crystallise.

EXAMPLE 19

*N-diethylaminoethoxy-α-(1-naphthyl)-Δ-pent-4-ene*

$C_{21}H_{29}NO$    M=311.44

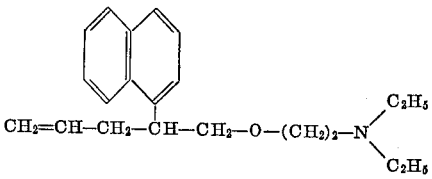

27.5 g. (0.114 mol) of methyl α-(1-naphthyl)-Δ-pent-4-enoate in solution in 5 cc. of ether are introduced into a mixture of 4.5 g. (0.115 mol) of lithium-aluminium hydride and 500 cc. of dry ether. The period of addition lasts 30 minutes. Heating under reflux takes place for 4 hours. The decomposition of the complex is effected by adding 105 cc. of water and 195 cc. of 10% $H_2SO_4$.

Distillation yields 18.5 g. of an opaque liquid with a $B.P._{0.815\ millibar}=126–127°$ C. The yield is 76.5% (theoretical quantity=24.2 g.).

The redistilled product is analytically pure α-(1-naphthyl)-Δ-pent-4-en-1-ol and has the following constants:

$B.P._{0.544\ millibar}=124–125°$ C.
$d_4^{25}=1.045$
$n_d^{26}=1.607$

Acidity index:
Calculated _____ 263
Found _____ 260

Gravimetric analysis, percent.—Calculated: C, 84.89; H, 7.60. Found: C, 84.44; H, 7.62.

21 g. (0.10 mol) of the α-(naphthyl)-Δ-pent-4-en-1-ol are caused to react with 13.5 g. (0.10 mol) of β-chloroethyl-N-diethylamine under the conditions of Example 10. Distillation yields 18 g. of a yellow liquid with an amino odor and a $B.P._{0.815\ millibar}=138–140°$ C. The yield is 58% (theoretical quantity=31 g.).

The redistilled product has the following constants:

$B.P._{0.68\ millibar}=132–133°$ C.
$d_4^{22}=0.9916$
$n_d^{23}=1.5672$

EXAMPLE 20

*Acid oxalate of N-diethylaminoethoxy-α-(1-naphthyl)-Δ-pent-4-ene*

$C_{23}H_{31}NO_5$    M=401.48

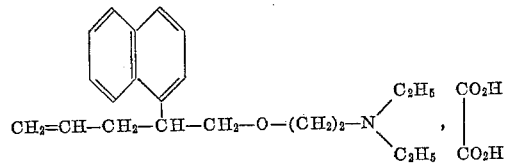

4.1 g. (0.032 mol) of dihydrated oxalic acid are dissolved while making tepid in 23 cc. of acetone and 10 g. (0.032 mol) of N-diethylaminoethoxy-(1-naphthyl)-Δ-pent-4-ene are added dropwise to this solution. As soon as the addition is completed, the solution is heated under reflux for 5 minutes and, while still hot, it is transferred into a beaker and 10 cc. of hexane are added thereto.

The forming solid is centrifuged after a night in the refrigerator, it is dried in vacuo and there are obtained 9.5 g. of white pasty product, the yield being 67% (theoretical quantity=14.1 g.).

After being recrystallised twice from ethyl acetate, the product is pure and has the following constants:

Melting point=57–58° C. (heating stage)

Acidity index:
Calculated _____ 278
Found _____ 278

Gravimetric analysis, percent.—Calculated: C, 68.84; H, 7.78; N, 3.49. Found: C, 68.72; H, 7.92; N, 3.66.

EXAMPLE 21

*N-diethylaminoethoxy-α-(1-naphthyl)-Δ-pent-4-ene phosphate*

$C_{21}H_{32}NO_5P$    M=409.43

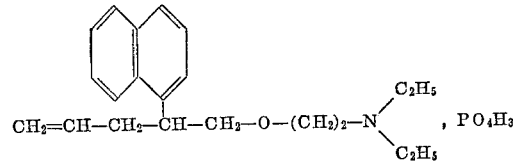

30 g. (0.096 mol) of α-(1-naphthyl)-diethylaminoethoxy-Δ-pent-4-ene are dissolved in 60 cc. of isopropanol and 10 g. (0.098 mol) of 85% orthophosphoric acid are added thereto. The mixture is treated as in Example 18. 24 g. of white crystals are obtained, these melting at 95–97° C. (heating stage). The yield is 60% (theoretical quantity=40 g.).

The product obtained is already pure, because after recrystallisation (alcohol-ether), the melting point remains unchanged.

Gravimetric analysis, percent.—Calculated: C, 61.62; H, 7.88; N, 3.42. Found: C, 61.76; H, 8.01; N, 3.51.

EXAMPLE 22

The compounds of the preceding examples have antispasmodic and peripheral and coronary vasodilatatory activity.

The antispasmodic activity has been studied on the isolated intestine, and the spasms caused by barium chloride to determine the papaverinic activity of the product, as related to that of papaverine, capable of arresting or increasing the movements induced in the isolated duodenum of a rat or the intestine of a guinea pig.

The atropinic coefficient is expressed in the same manner but in that case, the spasms are provoked by acetylcholine.

The vasodilatatory activity is determined by means of several methods, especially by means of the Langendorff apparatus which enables the coronary output of an isolated heart to be measured, e.g., that of a rabbit. The Langendorff coefficient represents the minimum dosage of the product causing the same output as $10^{-5}$ grams of papaverine, which is given the coefficient 100.

The vasodilatatory activity is also expressed by the femoral rotametric coefficient. This coefficient is determined as above by measuring the blood output into the femoral artery of a dog. In this case, the products are applied by intravenous injection, or by intra-arterial injection. Papaverine (1 mg. for intra-arterial and 25 mg. for intravenous injection) has the coefficient 100.

In the following tables, are given the activities of different compounds according to the invention. Unless indicated differently, the papaverinic activity is determined on the duodenum of a rat and the spasms are caused by $BaCl_2$. The papaverinic activity under the same conditions is 100. Whenever the spasms are caused by acetylcholine the activity is expressed by the coefficient 1000. The femoral rotametry is effected on a dog.

| Compound | Isolated intestine spasms | | Femoral Rotametry | Langendorff |
|---|---|---|---|---|
| | By $BaCl_2$ | By acetylcholine | | |
| N-dimethylaminoethoxy-β-(1-naphthyl)-β'-tetra-hydrofuryl isobutane mehiodide | 600 | -------- | 100 | -------- |
| N-piperidinoethoxy-[β-(1-naphthyl)-β'-tetrahydrofuryl]-isobutane phosphate | 300 | -------- | 106 | -------- |
| N-diethylaminoethoxy-α-(1-naphthyl)-Δ-hex-4-ene methiodide | 750 | -------- | -------- | -------- |
| N-dimethylaminoethoxy-α-(1-naphthyl)-Δ-hex-4-ene methiodide | 1,500 | 100 | -------- | -------- |
| N-(β-piperidinoethoxy)-α-(1-naphthyl)-Δ-hex-4-ene phosphate | 1 600 | -------- | 304 | 16 |
| N-(β-pyrrolidinoethoxy)-α-(1-naphthyl)-Δ-hex-4-ene methiodide | 1,000 | 100 | 100 | -------- |
| N-diethylaminoethoxy-α-(1-naphthyl)-Δ-pent-4-ene phosphate | 200 | -------- | 98 | -------- |
| N-diethylaminoethoxy-β-(1-naphthyl)-β-tetrahydrofuryl isobutane methiodide | 150 | -------- | -------- | -------- |

[1] Guinea pig.

The medicines containing a compound of this invention as the active element can be administered for the following illnesses: Arteriopathy, Raynaud's disease, Buerger's disease, cerebral vascular troubles, ulceration of the lower members, heaviness of the legs, intermittent claudication, nocturnal acroparesthesia, post phlebitic syndromes, trophic troubles, and cutaneous graftings.

What we claim is:
1. A compound of the formula

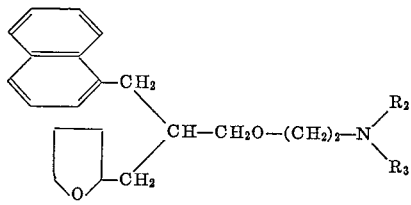

or

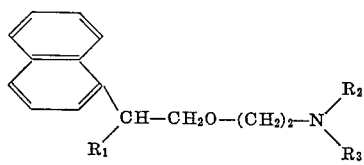

wherein $R_1$ is alkenyl having 3 to 4 carbon atoms; and $R_2$ and $R_3$ are selected from the group consisting of methyl, ethyl, and together with the nitrogen atom, piperidino, pyrrolidino and morpholino.

2. A salt of the group consisting of the acid addition salts and quaternary ammonium salts of a compound according to the formula of claim 1.

3. N-dimethylaminoethoxy - $\beta$ - (1-naphthyl)-$\beta'$-tetrahydrofuryl isobutane, in accordance with claim 1.

4. N-diethylaminoethoxy-[$\beta$-(1-naphthyl) - $\beta'$ - tetrahydrofuryl]isobutane, in accordance with claim 1.

5. N-piperidinoethoxy - [$\beta$ - (1-naphthyl) - $\beta'$ - tetrahydrofuryl]isobutane, in accordance with claim 1.

6. N-($\beta$-morpholinoethoxy( - $\beta$ - tetrahydrofuryl-$\beta'$-(1-naphthyl)isobutane, in accordance with claim 1.

7. N-diethylaminoethoxy - $\alpha$ - (1-naphthyl) - $\Delta$ - hex-4-ene, in accordance with claim 1.

8. N-dimethylaminoethoxy - $\alpha$ - (1-naphthyl) - $\Delta$ - hex-4-ene, in accordance with claim 1.

9. N-($\beta$-piperidinoethoxy) - $\alpha$ - (1-naphthyl) - $\Delta$ - hex-4-ene, in accordance with claim 1.

10. N - ($\beta$ - pyrrolidinoethoxy) - $\alpha$ - (1-naphthyl)-$\Delta$-hex-4-ene, in accordance with claim 1.

11. N-diethylaminoethoxy - $\alpha$ - (1-naphthyl)-$\Delta$-pent-4-ene, in accordance with claim 1.

No references cited.

NICHOLAS S. RIZZO, *Primary Examiner.*

J. TOVAR, *Assistant Examiner.*

UNITED STATES PATENT OFFICE
CERTIFICATE OF CORRECTION

Patent No. 3,347,858                        October 17, 1967

Etienne Szarvasi et al.

It is hereby certified that error appears in the above numbered patent requiring correction and that the said Letters Patent should read as corrected below.

Column 3, before line 5 insert $C_{22}H_{31}NO_2$                      M=341.47 column 4, lines 10 to 19, for that portion of the formula reading

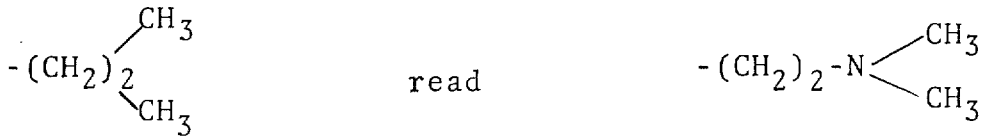

column 8, lines 43 to 50, for that portion of the formula reading $CH_2$-CH=                read                $CH_3$-CH= column 9, line 8, for "186" read -- 168 --; line 20, for "M=43547" read -- M=435.47 --; column 12, in the table, last column, line 5 thereof, for "16" read -- 160 --.

Signed and sealed this 5th day of November 1968.

(SEAL)
Attest:

EDWARD M. FLETCHER, JR.                EDWARD J. BRENNER
Attesting Officer                      Commissioner of Patents